United States Patent
Poon

(10) Patent No.: US 12,184,163 B2
(45) Date of Patent: Dec. 31, 2024

(54) SWITCHING POWER SUPPLY APPARATUS

(71) Applicant: Empower Electronic Limited, Hong Kong (HK)

(72) Inventor: Ngai Kit Franki Poon, Hong Kong (HK)

(73) Assignee: Ngai Kit Franki Poon, Hong Kong (CN)

(*) Notice: Subject to any disclaimer, the term of this patent is extended or adjusted under 35 U.S.C. 154(b) by 252 days.

(21) Appl. No.: 17/614,564

(22) PCT Filed: May 28, 2020

(86) PCT No.: PCT/IB2020/055063
§ 371 (c)(1),
(2) Date: Nov. 29, 2021

(87) PCT Pub. No.: WO2020/240458
PCT Pub. Date: Dec. 3, 2020

(65) Prior Publication Data
US 2022/0224222 A1    Jul. 14, 2022

(30) Foreign Application Priority Data
May 28, 2019   (HK) .................. 19124369.0

(51) Int. Cl.
H02M 1/34      (2007.01)
H02M 3/158     (2006.01)
H02M 3/335     (2006.01)

(52) U.S. Cl.
CPC ......... *H02M 1/346* (2021.05); *H02M 3/1582* (2013.01); *H02M 3/33553* (2013.01)

(58) Field of Classification Search
CPC . H02M 1/346; H02M 3/1582; H02M 3/33553
USPC ...................................... 363/21.04
See application file for complete search history.

(56) References Cited

U.S. PATENT DOCUMENTS

| | | | |
|---|---|---|---|
| 6,486,642 B1 * | 11/2002 | Qian ...................... | H02M 3/158 323/255 |
| 6,507,174 B1 * | 1/2003 | Qian ...................... | H02M 1/34 323/224 |
| 9,331,563 B2 * | 5/2016 | Li ......................... | H02M 1/34 |
| 2002/0185993 A1 * | 12/2002 | Qian ..................... | H02M 3/158 323/282 |

* cited by examiner

*Primary Examiner* — Yemane Mehari

(57) ABSTRACT

A power conversion apparatus comprises a first power supply rail, a second power supply rail, a power switching branch, and a circuit arrangement for recycling energies stored in parasitic reactive elements. The parasitic reactive element may be a parasitic inductor in series connection with a power switch of a power switching circuit or a parasitic capacitance across a semiconductor power switch. The circuit arrangement may comprise a clamper branch and/or a circuit arrangement comprising an auxiliary semiconductor switch. The clamper branch is for recycling energy stored in a parasitic inductor. An auxiliary semiconductor switch is connected in parallel with an output diode of a power switching circuit and operable by a control circuit to recycle energy stored on the parasitic capacitor.

18 Claims, 4 Drawing Sheets

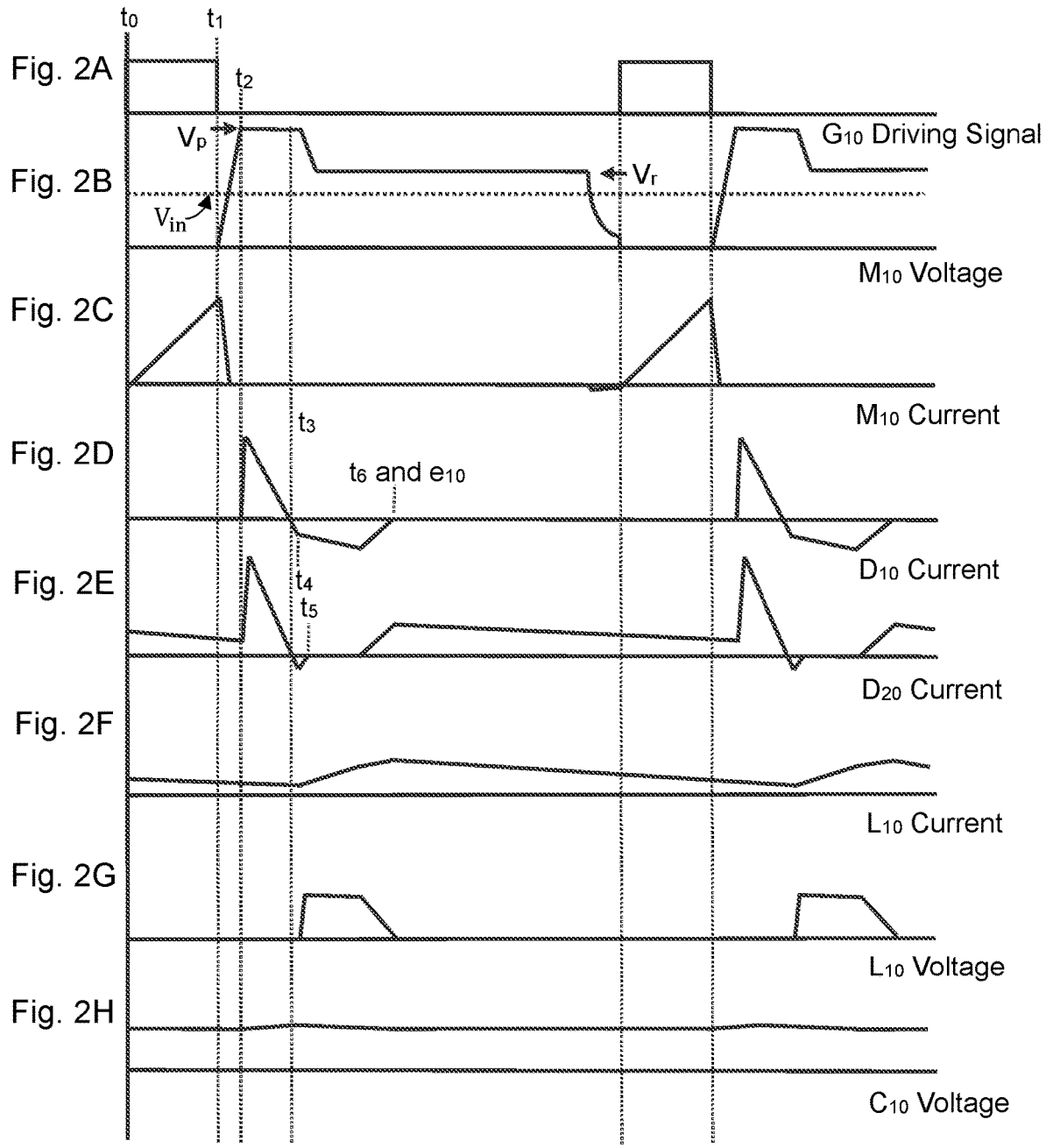

SWITCHING POWER SUPPLY APPARATUS

FIELD

Figure 1:
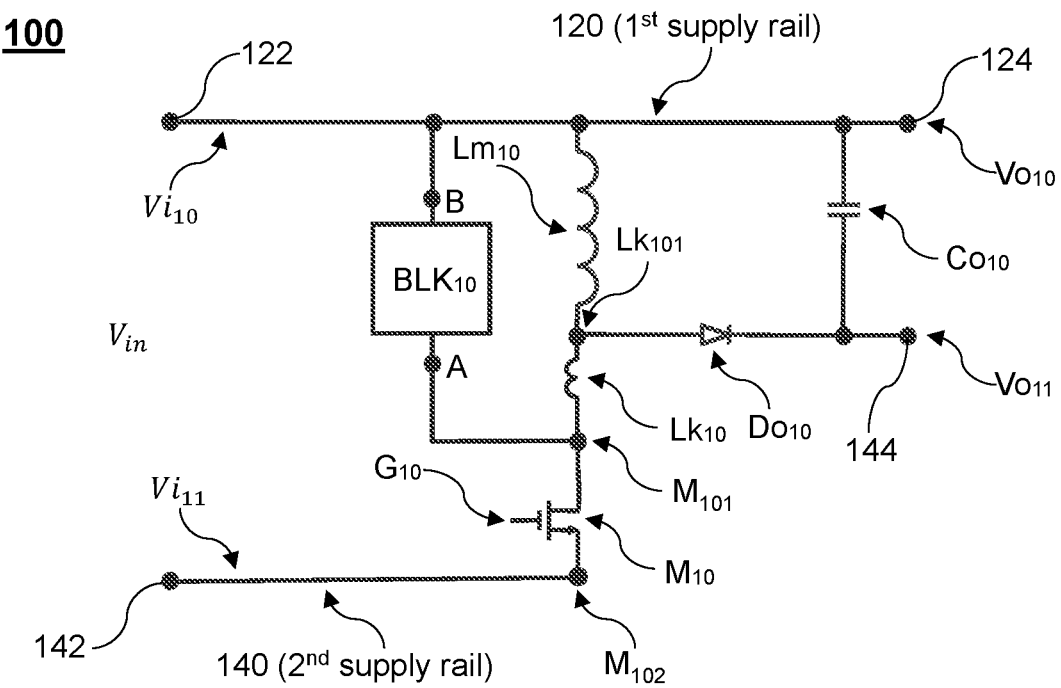

The present disclosure relates to power conversion apparatus and more particularly to switching power supply apparatus comprising an electronic power switching device which is switched at a switching frequency to perform power conversion.

BACKGROUND

Power loss in electronic circuits such as power conversion circuits results in a loss in efficiency as well as heat dissipation issues. With the advancement in circuit designs, efficiency of electronic circuits has been enhanced and power loss due to parasitic elements, such as parasitic capacitances becomes adversely salient. In addition to power loss, electronic charges stored in parasitic elements, especially parasitic elements of an electronic power such, such as a MOSFET, can result in voltage and/current spike and this would affect the reliability and/or durability of electronic circuits such as DC/DC converters.

DISCLOSURE

A power conversion apparatus comprising circuit arrangements to facilitate recycling of energy stored on reactive parasitic elements is disclosed.

The power conversion apparatus comprises a power switching branch which is configured to operate on input power to produce converted power by power switching operations, a power output portion for outputting the converted power, and a damper circuit. The switching branch comprises a power inductor and a semiconductor switch which are connected in series. The semiconductor switch is configured to switch between a power output state and a non-power output state at a switching frequency to perform the power switching operations. The clamper circuit is configured to output energy which is built-up or stored on a parasitic reactive element or parasitic reactive elements during a non-power output cycle to the power output portion in a power output cycle immediately following the non-power output state.

The power switching branch may comprise a parasitic inductor which interconnects the power inductor and the semiconductor switch. The parasitic inductor and the semiconductor switch have a common node. The damper circuit may be arranged as a clamper branch and comprises a damper capacitor, a first diode, and a parallel assembly which are in series connection. The parallel assembly interconnects the damper capacitor and the first diode, and comprises a parallel connection of a damper inductor and a second diode. The first diode has its anode connected to the common node and has its cathode connected to the parallel assembly. The clamper capacitor has a first terminal which is connected to the parallel assembly and a second terminal connected to a power supply rail. The second diode is connected with its anode connected to the cathode of the first diode and with its cathode connected to the damper capacitor.

The apparatus may comprise a first power supply rail and a second power supply rail. The power inductor comprises a first terminal which is connected to the first power supply rail and a second terminal which is physically connected to a first terminal of the semiconductor switch. The semiconductor switch of the power switching branch is a main power switch of the apparatus. The power output portion may comprise an output diode and an output capacitor. The output capacitor has a first terminal which is connected to the first power supply rail and a second terminal which is connected to an output terminal of the apparatus. The output diode has its anode connected to the second terminal of the power inductor, its cathode connected to the terminal of the output capacitor, and its diode forward direction towards the power output terminal.

The clamper circuit may comprise a semiconductor switch which is configured as an auxiliary electronic switch in parallel connection with the output diode; wherein the auxiliary electronic switch is switchable between an on-state during which an auxiliary current path permitting a flow of auxiliary current in a reverse direction opposite to the diode forward direction is formed and an off-state during which the auxiliary current path is blocked or impeded; and wherein the auxiliary electronic is configured to cause flow of a reverse current through the power inductor when current flowing through the power inductor drops to zero to neutralize energy build-up due to a parasitic capacitor of the semiconductor switch when the semiconductor switch is switched from an on-state to an off-state.

The first power supply rail and the second power supply rail are for connection to an electrical power source having a supply voltage to obtain source power for operation of the power switching branch. The power switching branch comprises at least one semiconductor power switch which is operable by a train of control pulses to perform switching operations whereby output power at an output voltage different to the supply voltage is available as output of the power conversion apparatus. The train of control pulses comprises alternate on-pulses and off-pulses, wherein an on-pulse has an on-duration and an off-pulse has an off-duration. The electronic power switch is in an off-cycle and is not current conductive during an off-pulse and is current conductive and in an on-cycle during an on-pulse. The damper branch comprises a damper circuit which is configured to receive and stored electronic charges after end of an on-pulse and before beginning of another on-pulse, wherein the damper branch comprises a clamper circuit which is configured to receive and stored electronic charges after end of an on-pulse and before beginning of another on-pulse. The electronic charges being stored are electronic charges which are residual, present or build-up on a parasitic reactive element or parasitic reactive elements of the power switching circuit during the on-pulse duration. The clamper circuit is to release and return the electronic charges to the power switching branch or the output of the power conversion apparatus during the off-pulse duration.

A power conversion circuit comprising an electronic power switch, a power output circuit comprising a power output terminal, a first power supply rail, a second power supper rail and an arrangement to recycle parasitic charges stored on the power switch during an on-cycle is disclosed. The power switch, which is a main power switch, comprises a switch first terminal, a switch second terminal which is connected to the second power rail and a switch third terminal which is a switching terminal. The power switch is switchable by a train of switching pulses between an on-state during which current is to flow from the switch first terminal to the switch second terminal and an off-state during which flow of current between the switch first terminal and switch second terminal is impeded or blocked. The output circuit comprises an inductor having an inductor first terminal which is connected to the first power supply rail and an inductor second terminal which is connected to the power switch first terminal, optionally a smoothing capacitor having a capacitor first terminal which is connected to the first power supply rail and a capacitor second terminal which is connected to the output terminal of the power output circuit, and a diode having diode forward direction, a diode first terminal which is connected to the inductor second terminal and a diode second terminal which is connected to the output terminal.

The output circuit comprises an auxiliary electronic switch which is in parallel connection with the output diode and which is switchable between an on-state during which an auxiliary current path permitting a flow of auxiliary current in a reverse direction opposite to the diode forward direction is formed and an off-state during which the auxiliary current path is blocked or impeded.

During power conversion operations and during an off-cycle of the main power switch, the auxiliary electronic switch is to be turned on to permit a continuation of current to flow in the inductor after a forward current flowing to the output terminal through the inductor and the output diode has fallen to zero and to remain turned on for an on-duration to facilitate a reverse current flow through the auxiliary electronic switch, wherein the on-duration is set to cause discharge of parasitic charges stored on the main power switch when the main power switch is in an off-state.

Since stored charges due to reactive parasitic elements are returned for power output, power losses and spiky stress due to charges stored in reactive parasitic elements can be mitigated, thereby improving apparatus reliability and power efficiency.

The energy stored in the parasitic elements can be substantial. For example, the energy stored in the parasitic capacitor $C_p$ of a semiconductor power switch is equal to ½ $C_p V^2$, where $C_p$ is the capacitance value of the parasitic capacitor $C_p$ and V is the voltage across the charged parasitic capacitor $C_p$ which is between 100V-400V for typical power supply applications.

FIGURES

Figure 1A:
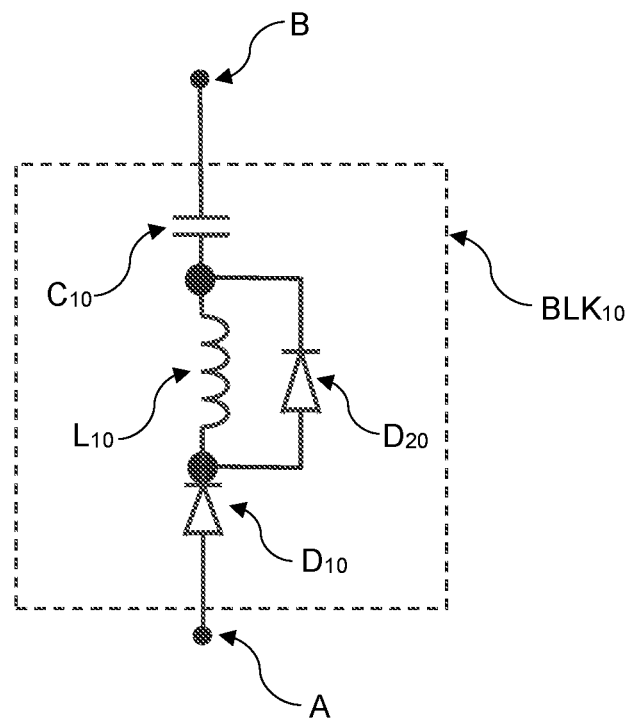
Figure 3:
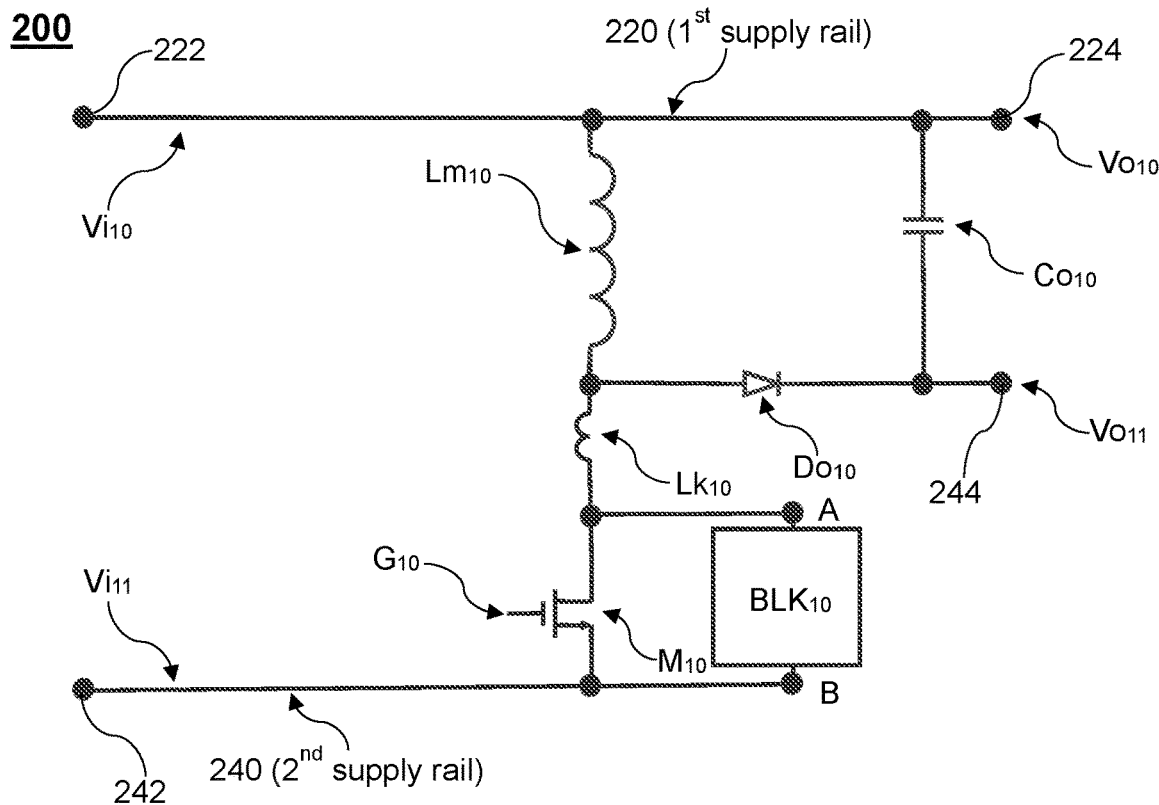
Figure 4:
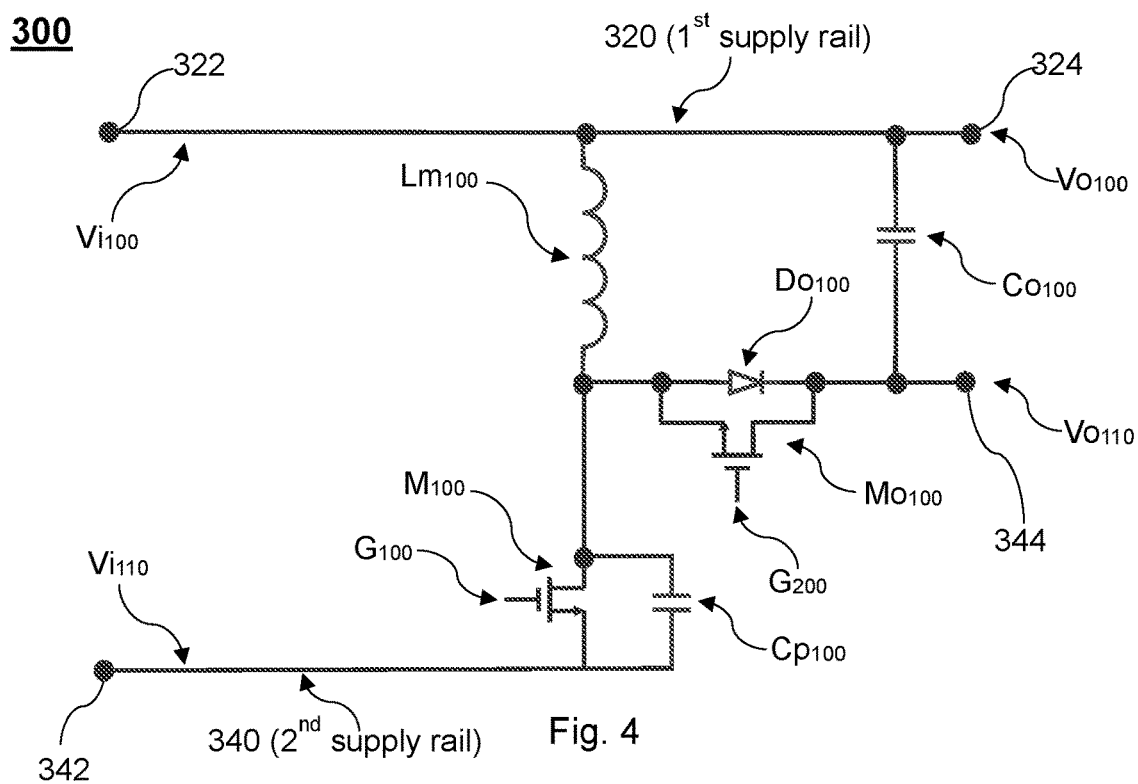
Figure 5:
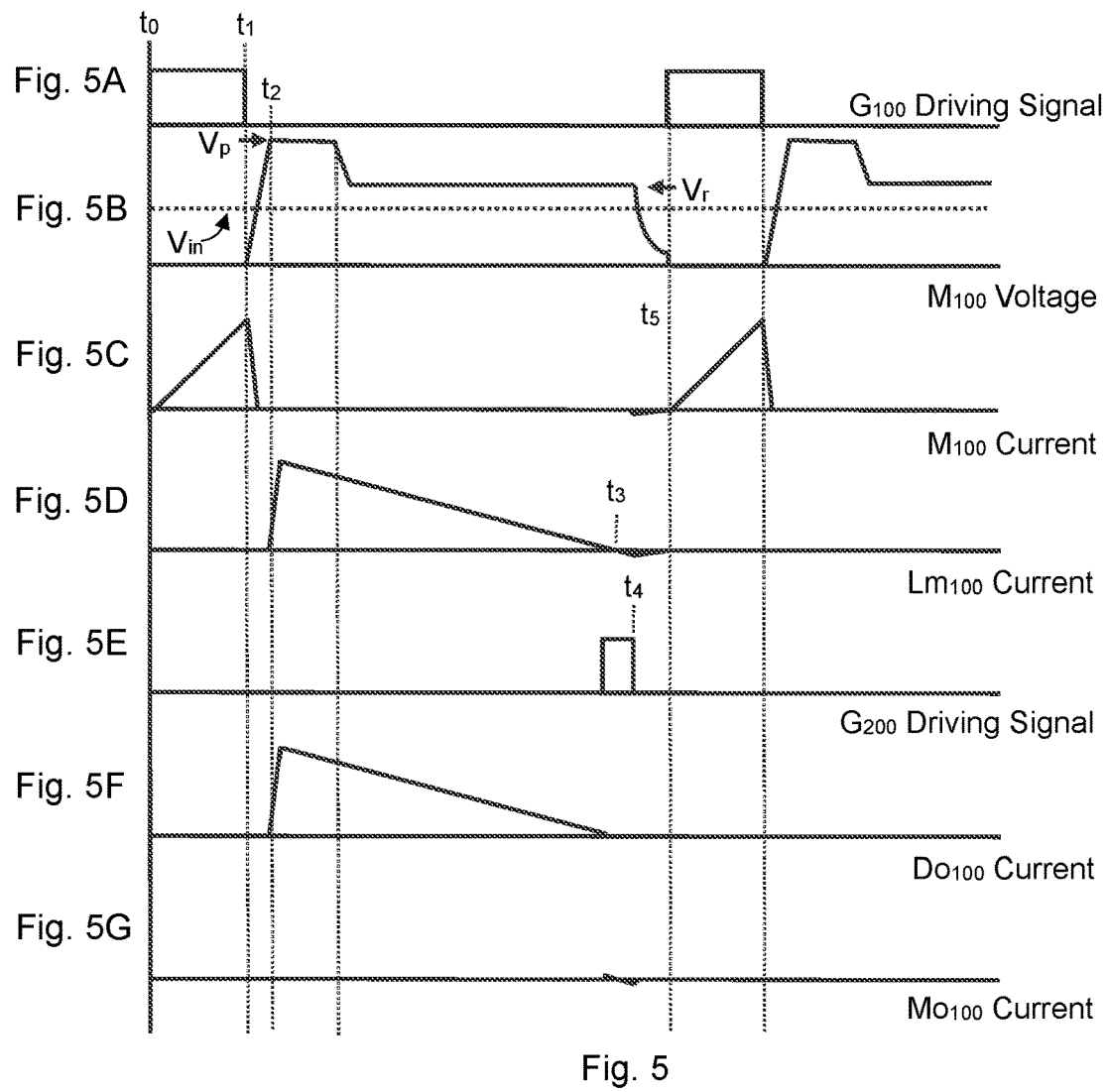
Figure 6:
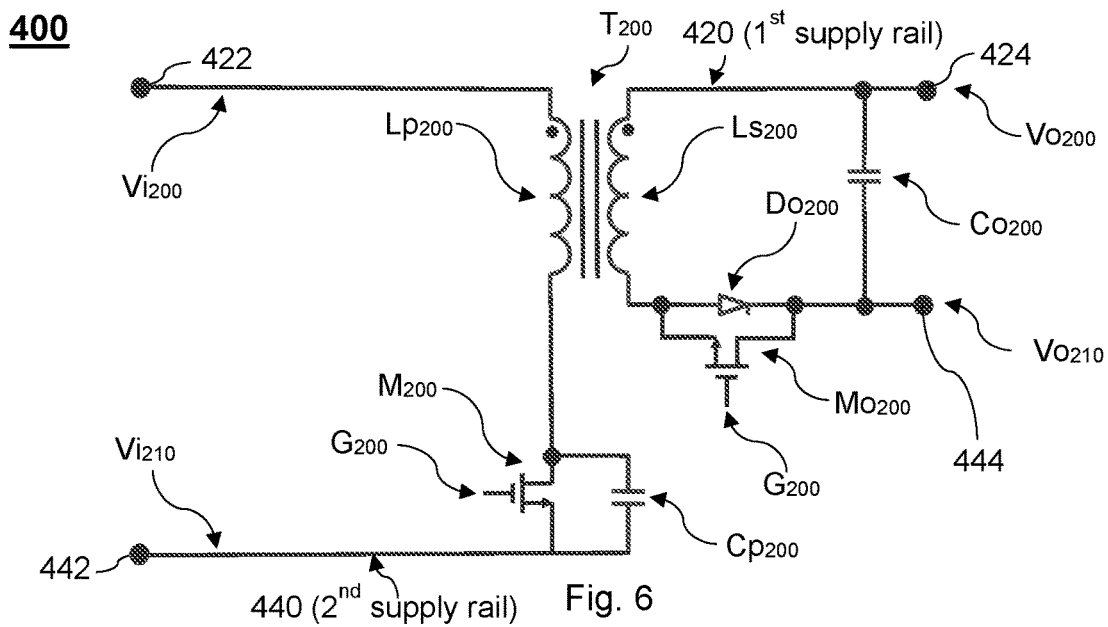

The present disclosure is described by way of example and with reference to the accompanying figures, in which:

FIG. 1 is a schematic circuit diagram of an example power conversion apparatus according to the present disclosure, FIG. 1A is a schematic circuit diagram of an example damper circuit according to the present disclosure, FIGS. 2A to 2H are time diagrams at various components or points on the power conversion apparatus of FIG. 1 during example operations, FIG. 3 is a schematic circuit diagram of an example power conversion apparatus according to the present disclosure, FIG. 4 is a schematic circuit diagram of an example power conversion apparatus according to the present disclosure, FIGS. 5A to 5G are time diagrams at various components or points on the power conversion apparatus of FIG. 4 during example operations, and FIG. 6 is a schematic circuit diagram of an example embodiment of the power conversion apparatus.

DESCRIPTION

An example power conversion apparatus 100 comprises a first power supply rail 120, a second power supply rail 140, a power switching branch, a clamper branch and a power output portion, as depicted in FIG. 1. The apparatus comprises an input side and an output side. The input side is for connection to an input power source and comprises a first terminal 122 which is at a first input electrical potential $Vi_{10}$ and a second terminal 142 which is at a second input electrical potential $Vi_{11}$. The output side is connected or for connection to a load and comprises a first terminal 124 which is at a first output electrical potential $Vo_{10}$ and a second terminal 144 which is at a second output electrical potential $Vo_{11}$.

The power switching branch is configured to operate on input power received on the input side and to output switched power on the output side by switching operations. The power switching branch comprises a serial assembly comprising a power switching device $M_{10}$ and an inductor $Lm_{10}$ which is connected in series with the power switching device $M_{10}$. The switched power is a converted form of the input power and is referred to as converted power herein. The power switching branch is connected across the first power supply rail 120 and the second power supply rail 140 to receive input power from a live power source when the input side of the apparatus is connected to the live power source. p The power output portion is coupled to the power switching branch and comprises a power output circuit portion which is configured to output the converted power. The power output circuit portion comprises an output terminal which is also a power output terminal 122124 of the power conversion apparatus.

The power output circuit portion comprises a capacitor $Co_{10}$ and a diode $Do_{10}$. The diode $Do_{10}$ is an output diode, or more specifically a current output diode, which is devised to output current to a load which is connected to the load side. The diode $Do_{10}$ has an input terminal, which is its anode, connected to the inductor $Lm_{10}$, and an output terminal, which is its cathode, connected with the capacitor $Co_{10}$, which is an output capacitor. The inductor $Lm_{10}$ may be considered as a part of the power output circuit portion where appropriate or convenient.

The inductor $Lm_{10}$ is a power inductor, comprising a first terminal ("power inductor first terminal") and a second terminal ("power inductor second terminal"). The power inductor first terminal is connected to the first power supply rail 120 and the power inductor second terminal is connected to the input terminal of the diode $Do_{10}$.

The output capacitor $Co_{10}$ comprises a first terminal ("output capacitor first terminal") which is connected to the first power supply rail 120 and a second terminal ("output capacitor second terminal") which is connected to the output terminal of the diode $Do_{10}$.

The diode $Do_{10}$ interconnects the inductor $Lm_{10}$ and the capacitor $Co_{10}$. More specifically, the diode $Do_{10}$ comprises a first terminal ("output diode first terminal") which is connected to the second terminal of the power inductor $Lm_{10}$ and a second terminal ("output diode second terminal") which is connected to the second terminal of the output capacitor $Co_{10}$. The first terminal of the diode $Do_{10}$ is an input terminal and the second terminal of the output diode $Do_{10}$ is an output terminal. The output diode $Do_{10}$ electrically connects the second terminal of the power inductor $Lm_{10}$ with the second terminal of the output capacitor $Co_{10}$. The output diode $Do_{10}$ is devised to facilitate flow of current in a single direction, which is the output direction, from the power inductor $Lm_{10}$. More particularly, the output diode $Do_{10}$ is devised to permit flow of power output current from the power inductor $Lm_{10}$ to the second terminal 144 on the outside side, but not in the opposite direction. As shown in the figure, the first terminal of the output diode $Do_{10}$ is an anode of the diode $Do_{10}$ and the second terminal is a cathode of the diode $Do_{10}$.

The output capacitor $Co_{10}$ first terminal and the output diode $Do_{10}$ second terminal are electrically joined to a common node. The common node and the second terminal on the output side of the power conversion apparatus is at same electrical potential of $Vo_{11}$.

The power switching device $M_{10}$ comprises a first terminal ("power switching device first terminal"), a second terminal ("power switching device second terminal") and a third terminal which is a control terminal $G_{10}$. The power switching device $M_{10}$ is operable in a first switching state and alternatively in a second switching state. When in the first switching state, which is an on-state, a current flow path is formed between its first terminal and its second terminal. When in the second switching state, which is an off-state, a high-impedance, current-blocking path is formed between its first terminal and its second terminal. The switching state of the power switching device $M_{10}$ is determined by the control signal which is applied at the third terminal, which is a control terminal. When an on-signal is applied to the control terminal while the power switching device $M_{10}$ is under normal operation bias, the power switching device $M_{10}$ will be in the on-state. Alternatively, when an off-signal is applied to the control terminal while the power switching device $M_{10}$ is under normal operation bias, the power switching device $M_{10}$ will be in the off-state. By applying a train of control signals comprising alternate on- and off-control pulses at a switching frequency to the control terminal, the power switching device $M_{10}$ will be alternately turned on and turned off at the switching frequency. In example embodiments, the power conversion apparatus is configured as a part of a switching-mode power supply and the switching frequency is typically in the range of 10 KHz to several MHz. In the example, the first terminal and the second terminal of the power switching device $M_{10}$ are, respectively, a higher potential terminal and a lower potential terminal so that power-delivering current is to flow from the first terminal to the second terminal through the low-impedance current flow path when the power switching device $M_{10}$ is in the on-state. The power switching device is an electronic power switching device ("switching device" in short) such as a semiconductor switch. A power MOSFET such as a GaN MOSFET is a typical example of such a power switching device. IGBT, BJT and thyristor are other examples of semiconductor electronic power switching device suitable for switching power supply applications.

The power switching device $M_{10}$ and the power inductor $Lm_{10}$ are connected in series. More specifically, the first terminal of the power switching device $M_{10}$ is physically connected with the second terminal of the power inductor $Lm_{10}$ to form a serial assembly comprising the power switching device $M_{10}$ and the power inductor $Lm_{10}$. However, due to parasitic inductances, for example, parasitic inductances due to circuit tracks on a printed circuit board, a plurality of printed circuit boards, or other circuit substrate which forms part of the power conversion apparatus, the actual and effective electrical circuit components and component connection of the serial assembly may be represented by the schematic circuit diagram of FIG. 1, in which a parasitic inductance $Lk_{10}$ is shown interconnecting the power inductor $Lm_{10}$ and the power switching device $M_{10}$.

Referring to FIG. 1, the parasitic inductance $Lk_{10}$ is represented as a two terminal device having a first terminal ("parasitic inductance first terminal") and a second terminal ("parasitic inductance second terminal"). The parasitic inductance first terminal is connected to the second terminal of the output side via the output diode $Do_{10}$. More specifically, the anode of the diode $Do_{10}$ is physically and electrically connected to a junction node interconnecting the power inductor $Lm_{10}$ and the parasitic inductance $Lk_{10}$, and the parasitic inductance second terminal is connected to the power switching device $M_{10}$ first terminal.

In the example power conversion apparatus, the first power supply rail 120 is a supply rail which is biased at a higher electrical potential of a higher voltage of $Vi_{10}$ and the second power supply rail 140 is a supply rail which is biased at a lower electrical potential rail of a lower voltage of $Vi_{11}$. In typical circuit examples, the second power supply rail 140 is tied to the circuit ground which is at the lower voltage of $Vi_{11}$ and the lower voltage is the voltage of the reference ground. The reference ground is a circuit electrical ground which defines a reference voltage or a ground voltage of the power conversion circuit of the power conversion circuit. In example embodiments, the first power supply rail 120 is at a positive DC supply voltage and the second power supply rail 140 is at reference ground or zero voltage or can be at a negative voltage.

To operate, the power conversion apparatus is electrically connected to an electrical energy source. The electrical energy source, which is typically a DC power source, can also be an AC source. When the power conversion apparatus is so connected to the electrical energy source, the first terminal 122 on the input side is connected to a current output terminal of the energy source and the second terminal 142 on the input side is connected to a current return terminal of the energy source.

During switching power operations, a control signal source is to operate to send control signals to control switching operations of the power switching device $M_{10}$. The control signal source may be a microprocessor-based controller or a logic controller such as a programmable logic array (PLA) type of devices which is programmed with switching pulse signals. The control signals may be voltage pulses which are arranged as a train of switching pulses, such as a train of square pulses. The switching pulse is applied at the control terminal of the switching device $M_{10}$. In example embodiments, the power switching device is to operate in the on-state when the voltage at the control terminal is at or above an on-voltage and to operate in the off-state when the voltage at the control terminal is below the on-voltage. For such power switching devices, the on-signal is at the on-voltage and the off-signal is at an off-voltage which is well below the on-voltage, for example, at or near the zero voltage or the reference voltage. For such embodiments, the train of switching pulses comprises pulses having a peak voltage which is at or above the on-voltage or a trough voltage which well below the on-voltage. During power switching operations, the switching device $M_{10}$ is turned on to an on-state when an on-voltage appears at the control terminal $G_{10}$, the power conversion circuitry will be in an on-cycle, and a power-delivering current will flow through the current conductive channel which is defined between the first terminal and the second terminal of the switching device $M_{10}$. When an off-voltage is applied to the control terminal $G_{10}$, the switching device $M_{10}$ is turned off to the off-state and the power conversion circuitry will be in an off-cycle. When in the off-state, the path which was a current conductive channel in the on-state becomes a high-impedance, current-blocking path which impedes flow of power-delivering current. The control signals alternate between an on-state pulse having an on-state steady-state voltage and an off-state pulse having an off-state steady-state voltage, to alternately turn on and turn off the conductive path of the electronic switching device $M_{10}$ to facilitate switched power output. Therefore, the power switch $M_{10}$ comprises a switchable current conductive path (or current conductive channel) which is defined between the first terminal and the second terminal of the switching device $M_{10}$.

When the electronic power switch $M_{10}$ is tuned on and operates in the on-state, current from the first power supply rail 120 will flow through the inductors $Lm_{10}$ and $Lk_{10}$ and the electronic switching device $M_{10}$, and then return to the energy source through the second power supply rail 140. When in the on-state, the electronic power switch $M_{10}$ has a very low drop or a near zero voltage drop across its first and second terminals, and the voltage at the power output terminal 144 of the power conversion apparatus is at its lowest voltage.

When the power switch $M_{10}$ is abruptly switched from the on-state to the off-state, the current path which is formed between the first and second terminals of the power switch $M_{10}$ during the on-state abruptly becomes a high-impedance current blocking channel and the current path is abruptly blocked. As a result, the power-delivering current which was flowing in the inductors $Lm_{10}$ and $Lk_{10}$ immediately before the off-state will drop abruptly to zero or near-zero. This abrupt drop in current in the inductors $Lm_{10}$ and $Lk_{10}$ means the building up of electrical stress on the inductors, and the electrical stress built-in will be released as a spiky current through a parasitic capacitive path of the power switch $M_{10}$. Since a dominant parasitic capacitive path of a semiconductor switch such as the power switch $M_{10}$ is one which is in parallel with the channel interconnecting its first and second terminals, a spiky current flowing through the dominant parasitic capacitive path will likely damage the channel and the semiconductor switch. Therefore, as a result of the abrupt change in the switching state of the power switch $M_{10}$, the electrical stress due to energy in the inductors $Lm_{10}$ and $Lk_{10}$ immediately before the change into the off state, if not properly defused or clamped, will result in a spike voltage which will damage the power switch $M_{10}$. Even if the power switch $M_{10}$ is not damaged, the flow of the spiky current through the resistive portion of the power switch $M_{10}$ results in undesirable power loss. In the example of FIG. 1, the electrical stress which would induce a spike voltage due to the power inductor $Lm_{10}$ is clamped by the output capacitor $Co_{10}$. However, the electrical stress which is capable of producing a spike voltage due to the parasitic inductor $Lk_{10}$ is not clamped by the output capacitor $Co_{10}$. A damper branch $BLK_{10}$ is devised to mitigate the electrical stress which occurs during power switching operations due to the parasitic inductor $Lk_{10}$. A power switch $M_{10}$ is abruptly switched from the on-state to the off-state herein if the transition time from the on-state to the off-state is small enough or below a threshold transition time so that the energy in the parasitic inductor $Lk_{10}$ immediately before the on-state is sufficient to develop a spiky discharge current through the dominant parasitic capacitive path of the semiconductor switch.

Specifically, a damper branch comprising a damper circuit is provided to mitigate the risk of spike voltage causing damage to the semiconductor power switch $M_{10}$.

An example damper circuit $BLK_{10}$ of the damper branch, as depicted in FIG. 1A, comprises a diode $D_{10}$, a capacitor $C_{10}$, and a parallelly connected sub-assembly comprising an inductor $L_{10}$ and a diode $D_{20}$. The diode $D_{10}$, the capacitor $C_{10}$ and the parallelly connected sub-assembly are electrically connected (connected in short) in series, with the parallel sub-assembly of the inductor $L_{10}$ and the diode $D_{20}$ connected intermediate the diode $D_{10}$ and the capacitor $C_{10}$. The diode $D_{10}$ is a first diode of the damper circuit, with its anode and the first terminal A forming a common electrical node and with its cathode connecting to the parallel connection of $L_{10}$ and $D_{20}$. The diode $D_{10}$ has a forward conductive direction (or forward direction in short) which defines the direction of intended current flow of the diode and a reverse direction which is not intended for current flow. The forward conductive direction of the diode $D_{10}$ is in a direction which extends from the first terminal A towards the second terminal B. The reverse direction is a direction which is opposite to the forward conductive direction, that is, in a direction from the second terminal B towards the first terminal A.

The capacitor $C_{10}$ is a clamping capacitor of the clamper circuit, having a first terminal which forms the second terminal B and a second terminal which is connected to the parallel connection of $L_{10}$ and $D_{20}$.

The inductor $L_{10}$ is connected in series with the first diode $D_{10}$ and the capacitor $C_{10}$, with the inductor $L_{10}$ connected between the first diode $D_{10}$ and the capacitor $C_{10}$.

The diode $D_{20}$ is a second diode of the damper circuit which is connected in series with the first diode $D_{10}$ and the capacitor $C_{10}$, with its anode connected to the cathode of the first diode $D_{10}$ and with its cathode connected with the capacitor $C_{10}$. The forward direction of the second diode $D_{20}$ and the forward direction of the first diode $D_{10}$, which is a forward current direction from the anode to the cathode, are the same.

The clamper circuit $BLK_{10}$ comprises a first terminal A and a second terminal B and is electrically connected such that its first terminal A is physically and electrically connected with the first terminal of the power switch $M_{10}$ and its second terminal B is physically and electrically connected (connected in short) with one of the power supply rails, which in the example of FIG. 1 is the first power supply rail $Vi_{10}$. The connection, when expressed in AC equivalent models, is equivalent to a parallel connection of the damper circuit $BLK_{10}$ with the switchable current conductive path of the power switch $M_{10}$, and more specifically with the first terminal A of the clamper circuit electrically connected with the first terminal of the power switch $M_{10}$ and the second terminal B electrically connected with the reference ground.

Example switching power operations of the power conversion apparatus of FIG. 1 will be described with reference to the time diagrams of FIGS. 2A to 2H.

During switching power operations, control signals in the form of a train of switching pulses comprising alternate on-pulses and off-pulses are to be applied at the control terminal $G_{10}$ of the power switch $M_{10}$. The switching pulses comprises alternate on-pulses and off-pulses. When an on-pulse is applied at the control terminal $G_{10}$ of the power switch $M_{10}$ a current conductive channel having an extremely low resistance is formed between its first terminal $M_{101}$ and its second terminal $M_{102}$. When an off-pulse is applied at the control terminal $G_{10}$ of the power switch $M_{10}$, an extremely high impedance is present between the first terminal and the second terminal, thereby impeding current flow between the first terminal and the second terminal. When an off-pulse is applied at the control terminal $G_{10}$ of the power switch $M_{10}$, the extremely low resistance current channel which was formed between the first terminal and the second terminal and which defines a low-impedance current path during the on-pulse duration is converted into a high impedance current block.

A switching pulse which is used as a switching control signal is typically a pulse having a sharp rising edge and a sharp falling edge. A sharp edge herein means an edge time which is substantially or much smaller than the duration of the pulse. As a convenient reference, a sharp edge time may mean an edging duration which is less than 1%, 0.1%, 0.01%, 0.001%, 0.0001%, or even less of the pulse duration. Edging duration of a pulse herein means a transition time between an initial state and a steady state of the pulse. The sharp rising edges and falling edges means the pulses have an abrupt beginning and an abrupt end. An abrupt beginning herein means an abrupt transition from off-voltage to on-voltage and an abrupt end means an abrupt transition from on-voltage to off-voltage.

An example train of switching pulses as an example of power conversion control signals is depicted in FIG. 2A. The switching pulses comprises alternately disposed on-pulses and off-pulses. An example on-pulse rises instantly from an off-voltage to an on-voltage at an initial time $t_0$, falls abruptly to an off-voltage at time $t_1$, and stays at the on-voltage level between $t_0$ and $t_1$. The time duration, $t_1-t_0$, which is delimited by the time of the sharp rising edge and the sharp falling edge immediately after the sharp rising edge, is referred to herein as an on-pulse duration. The time duration which is delimited by the time of the sharp falling edge at $t_0$ and the sharp rising edge immediately after the sharp falling edge at $t_0$, is referred to herein as an off-pulse duration. The ration between the on-pulse duration and the off-pulse duration is known as mark-to-space ratio of the control signals.

When an on-pulse is applied at the control terminal of the power switch $M_{10}$, the power switch $M_{10}$ is turned on and will stay in the on-state for the duration of the on-pulse when the on-pulse voltage at the control terminal is at or above the on-voltage of the power switch $M_{10}$, and a current channel having an extremely low impedance is formed between the first terminal and the second terminal to define a current path. As a result of the change in impedance of the current channel, current will start to ramp up in the inductors $Lm_{10}$ and $Lk_{10}$ and flow into the power switch $M_{10}$. The current which flows into and through the power switch $M_{10}$ is an on-current or an on-state current which is to enter the power switch $M_{10}$ at its first terminal and exit at its second terminal. The on-state current flows through the inductors $Lm_{10}$ and $Lk_{10}$ and then flow through the current channel of the power switch $M_{10}$. When the power switch $M_{10}$ is in the on-state, the voltage-drop across the first and second terminals which cooperate to define the current channel is extremely low, that is zero or near zero, and is negligible. The example on-pulse has an on-pulse duration which is equal to $t_1-t_0$ and has a sharp falling edge. The on-pulse ends abruptly at time $t_1$ when the on-pulse drops from the on-voltage to reach the off-voltage. The on-pulse ends abruptly and the abrupt ending of the on-pulse overlaps or coincides with an abrupt beginning of the off-pulse, which begins also at $t_1$. In this example, the apparatus is in a non-power output mode when in the on-cycle and no power output is available from the apparatus.

When an off-pulse is applied at the control terminal of the power switch $M_{10}$, the power switch $M_{10}$ is turned off and will stay in the off-state for the duration of the off-pulse when the voltage at the control terminal is at an off-voltage which is below the on-voltage of the power switch $M_{10}$. When in this off-state, the channel between the first terminal and the second terminal has an extremely high impedance to impede flow of current, and output power is available by flow of current from the first supply rail 120, through the inductor $Lm_{10}$, and then to the power output terminal 144 via the diode $D_{10}$. In the example, the apparatus is in a power output mode when in an off-cycle.

When the power switch $M_{10}$ is abruptly turned off at time $t_1$, that is, at the time when the next off-pulse begins or when the last on-pulse ends, the current which was flowing in the inductor $Lm_{10}$ immediately before the end of the last on-pulse can no longer flow into the channel of the power switch $M_{10}$, and will be diverted to flow through the output diode $Do_{10}$ to the power switching branch output $Vo_n$ for power output.

The current which was a residual current flowing in the parasitic inductor $Lk_{10}$ at the end of the last on-pulse, will not be directed to the power output terminal 144 via the diode $D_{10}$, will flow through a parasitic capacitor which is inherently present on the power switch $M_{10}$, unless a current diversion or a current bypassing path is duly provided. If the current were to flow through the dominant parasitic capacitor of the power switch $M_{10}$, a high voltage stress resulting from the flow of the residual current from the first terminal the second terminal of the power switch $M_{10}$ can result in breakdown of the power switch $M_{10}$.

The parasitic capacitor is due to a summation of parasitic capacitances which are inherently distributed on the power switch $M_{10}$ and which are spread between the first terminal and the second terminal of the power switch $M_{10}$.

Referring to FIG. 2B, the voltage at the first terminal of the power switch $M_{10}$ begins to rise from a base voltage $V_b$ at time $t_1$ as a result of the beginning of the off-pulse at $t_1$, where $t_1$ is also the time when the on-pulse ends, and will reach a peak voltage $V_p$ at time $t_2$. The voltage at the first terminal of the power switch $M_{10}$ stays at the peak voltage $V_p$ for a short duration, then falls to a lower reverse voltage $V_r$ and stays at the reverse voltage $V_r$ until nearly the end of the off-pulse. The reverse voltage $V_r$ is equal to $V_{in}+V_{Co10}$, where $V_{in}$ is the input voltage to the circuit and equals to $Vi_{10}-Vi_{11}$ and $V_{Co10}$ is the voltage across the output capacitor $Co_{10}$.

The abrupt beginning of the off-pulse signifies an abrupt switching off of the current path of the power switch $M_{10}$. When the power switch is abruptly turned off from a steady on-state, the voltage appearing at the first terminal of the power switch $M_{10}$ will rise. However, this voltage rise is less abrupt than the ending of the on-pulse due to inductances of the power conversion circuit.

The current to flow through the power switch $M_{10}$ rises from no current at $t_0$ to reach a peak current at $t_1$. The rate of rise is determined by the inductances of the inductors $Lm_{10}$ and $Lk_{10}$. During the initial off-period at between $t_1$ and $t_2$ of the off cycle, the current which flows through the conductive channel of the power switch $M_{10}$ drops from the peak current at time $t_1$ to zero current at time $t_2$, as depicted in FIG. 2C.

Therefore, at the instant immediately before the abrupt ending of the on-pulse, an on-state current is flowing flow the inductors $Lm_{10}$ and $Lk_{10}$ and the current path of the power switch $M_{10}$. When the on-pulse ends abruptly, the end current, which is the current flowing in the inductor $Lk_{10}$ immediately before $t_1$, needs to find a current diversion path to ensure current continuity to prevent breakdown of the power switch $M_{10}$ due to voltage stress built up between the first and the second terminal.

The damper circuit herein provides a current diversion path for storage of energy stored in the parasitic inductor $Lk_{10}$. In this example, the damper circuit $BLk_{10}$ provides a current diversion path for the parasitic inductor $Lk_{10}$, and the output capacitor $Co_{10}$ provides a current diversion path for the power inductor $Lm_{10}$ during the transition period.

At time $t_1$ when the power switch $M_{10}$ is abruptly switched off, the end current which was flowing in the parasitic inductor $Lk_{10}$ immediately before the on-pulse ends at $t_1$ will continue to flow, but is redirected to flow into the clamper circuit $BLK_{10}$. Specifically, the end current will flow into the clamper circuit $BLK_{10}$ via terminal A, then flow forwardly through the first diode $D_{10}$, further flow forwardly through the second diode $D_{20}$ of the parallel connection, and finally reach and charge up the capacitor $C_{10}$.

At $t_2$, the voltage at the first terminal $M_{101}$ of the power switch $M_{10}$ has risen to $V_p$. When the first terminal $M_{101}$ of the power switch $M_{10}$ is at $V_p$, both the damper circuit and the first diode $D_{10}$ are in forward bias. A forward current will rise rapidly and flow through the first diode $D_{10}$ in the diode forward direction to charge the capacitor $C_{10}$. The amplitude of the forward current gradually diminishes as the capacitor $C_{10}$ is being charged up and the voltage across the capacitor $C_{10}$ increases. At $t_3$, the voltage across the capacitor $C_{10}$ has risen to a level such that the forward current stops and a reverse current will flow in the first diode $D_{10}$.

By $t_3$, and latest by $t_4$, the end current which was in the parasitic inductor $Lk_{10}$ at $t_1$ will be completely discharged through the first diode $D_{10}$ and stored in the capacitor $C_{10}$. Therefore, the electronic charges of the end current, which was flowing in the parasitic inductor $Lk_{10}$ immediately before the on-pulse end at $t_1$, is completely transferred to the capacitor $C_{10}$ during the charge transfer duration between $t_2$ and $t_3$.

At $t_2$, the charge stored on the capacitor $C_{10}$ clamps the voltage at the first terminal of the power switch $M_{10}$ at $V_p$, as depicted in FIG. 2B. The clamped voltage is due to the input reference voltage $V_i$, the peak current flowing through $Lk_{10}$, and the voltage due to the capacitor $C_{10}$ which is dependent on the capacitance value of $C_{10}$. In some conditions, the voltage $V_c$ due to the capacitor $C_{10}$ is equal to $V_p - V_i$.

The charge build-up at the capacitor $C_{10}$ needs to be discharged, since continuous building up of charges at the capacitor $C_{10}$ can eventually cause stress-induced breakdown of the power switch $M_{10}$.

At $t_4$, the first and second diodes become reversely biased by the voltage of the capacitor $C_{10}$. However, a reverse current will flow the first diode $D_{10}$ between $t_3$ and $t_6$, as depicted in FIG. 2D, where the duration between $t_3$ and $t_6$ is the reverse recovery time $t_{rr\_D1}$ of the first diode $D_{10}$. The rate of flow of the reverse current is determined by the parallel connection, that is, the inductor $L_{10}$ and the second diode $D_{20}$ during duration $t_3$ and $t_4$, where $t_4$ is between $t_3$ and $t_6$. The duration between $t_3$ and $t_4$ is substantially or much shorter than the duration between $t_4$ and $t_6$, for example, duration between $t_3$ and $t_4$ may be 10-20% the duration between $t_4$ and $t_6$.

The reverse current will flow through both the first diode $D_{10}$ and the second diode $D_{20}$ during duration $t_3$ and $t_4$.

The second diode $D_{20}$ is selected such that it has a substantially or much shorter reverse recovery time $t_{rr\_D2}$ than the reverse recovery time $t_{rr\_D1}$ of the first diode $D_{10}$, but has a reverse recovery time $t_5 - t_3$ which is larger than the duration $t_4 - t_3$. The duration $t_4 - t_3$ is the duration necessary for the residual end current in the parasitic inductor $Lk_{10}$ to be fully discharged into the clamper circuit.

Since a much faster reverse recovery diode is selectively used as the second diode $D_{20}$, the second diode $D_{20}$ will end reverse current flow much earlier than the first diode $D_{10}$ such that when reverse current flow has ended in the second diode $D_{20}$, reverse current flow still continues in the first diode $D_{10}$ and for a further duration longer or much longer (say 2-5 times) than the reverse recovery time of the second diode $D_{20}$.

At time $t_5$, reverse current has stopped passing through the second diode $D_{20}$, but continues to pass through the first diode $D_{10}$, as depicted in FIGS. 2D and 2E.

With the second diode $D_{20}$ ceased to be reverse conductive at $t_5$, the charge in the capacitor $C_{10}$ will build up a reverse voltage across the inductor $L_{10}$ and this reverse voltage across the inductor $L_{10}$ will keep the first diode $D_{10}$ conducting in the reverse direction until end of its reverse recovery time $t_{rr\_D1}$.

The reverse recovery time $t_{rr\_D1}$ of the first diode $D_{10}$ ends at $t_6$ and reverse current will stop passing through the first diode $D_{10}$ at $t_6$. Therefore, reverse current through the diodes of the clamper circuit complete stops at $t_6$.

The voltage across the inductor $Lk_{10}$ between the time duration $t_5 - t_3$ is dependent on the voltage difference between $V_p$ and $V_r$, as shown in FIG. 2B, where $V_r$ is the reverse voltage developed across the damper circuit due to the voltage of the output capacitor $C_{10}$, the input voltage $V_{in}$ (which is equal to $Vi_{10}$ when $Vi_{11}$ is at reference ground) and the diode voltage drop across the first diode $D_{10}$.

To attain a state of equilibrium after each switching cycle, comprising an on-pulse and an off-pulse, it is desirable that the charge build up at the capacitor $C_{10}$ during each on-to-off switching is fully discharged before the next off-to-on cycle commences. When a state of equilibrium is attained, there shall be no residual charge on the capacitor $C_{10}$ when the next switching cycle commences.

In order to attain the state of equilibrium, the inductor $L_{10}$ needs to absorb the reverse voltage $V_r$ which is generated during the reverse recovery time.

The value of $V_p$ is selected such that the charge which is pumped into the capacitor $C_{10}$ between the times $t_2$ and $t_3$ is equal to the charge discharged by reverse current during the duration between $t_3$ and $t_6$. A higher reverse voltage $V_p$ will result in a higher reverse current flow through the inductor $L_{10}$.

The second diode $D_{20}$ is a fast reverse recover diode and its reverse switching loss will be insignificant.

The first diode $D_{10}$ is a slow reverse recovery diode. The reverse voltage $V_r$ across the first diode $D_{10}$ during the reverse recovery time is small. Therefore, power loss ($V_r \times I_r$) due to the first diode $D_{10}$ during reverse recovery is also small.

Since the electronic charge which was pumped into the capacitor $C_{10}$ during the time period between $t_2$ and $t_3$ will be delivered to the output side through the diode $Do_{10}$ during the off cycle, the power conversion circuit is almost lossless or approaching theoretical lossless limit.

The inductor $L_{10}$ may be a discrete component, an inductive trace on a printed circuit board, and/or leakage inductance due to another component without loss of generality. The power switch $M_{10}$ may be a discrete semiconductor switch, such as MOSFET or IGBT without loss of generality, Another example power conversion apparatus comprises a first power supply rail 220, a second power supply rail 240, a power switching branch, and a damper branch, as depicted in FIG. 2. The power conversion apparatus of FIG. 2 is substantially identical to that of FIG. 1, except that the second terminal B of the damper circuit $BLK_{10}$ is electrically connected to the first power supply rail $Vi_{10}$ or the reference ground. The features and description herein in relation to the power conversion apparatus of FIG. 1 is incorporated herein by reference and to apply mutatis mutandis, with numerals increased by 100, without loss of generality.

In general, the clamper circuit is disposed such that its first terminal A is electrically connected to a circuit node where a positive voltage spike can be expected during switching operations and its second terminal B is connected to a ground or reference level of the circuit.

Parasitic capacitance can be a problem, if not a nuisance. For example, parasitic capacitance present across the switchable conductive path of an electronic switch such as the electronic power switch $M_{10}$ can generate a high current spike at the turn on edge and cause damage. Furthermore, energy stored in parasitic capacitance which is parallel to the main power switch may be discharged through resistive components or parasitic resistance and this is a cause of power loss. Power loss due to parasitic capacitance discharge is known to be related to the switching frequency. It is known that the higher the switching frequency, the higher the power loss due to power dissipation as a result of power discharge by parasitic capacitance.

Power loss of not only adversely affects power efficiency a power conversion circuit, but also generates heat dissipation issues which can be difficult to resolve, as the requirements for device miniaturization have become increasingly stringent.

The example power conversion apparatus of FIGS. 1 and 2 comprises a basic power conversion circuit of a conventional buck-boost power converter and has the basic functions of a buck-boost power converter without loss of generality.

An example power conversion apparatus according to another aspect of the present disclosure comprises a first power supply rail 320, a second power supply rail 340, and a power switching branch comprising a power switching circuit, as depicted in FIG. 4. The power conversion apparatus of FIG. 2 is basically identical to that of FIG. 1, and the features and description herein in relation to the power conversion apparatus of FIG. 1 is incorporated herein by reference and to apply mutatis mutandis, with numerals increased by 200, without loss of generality.

The power switching circuit comprises a power switching device $M_{110}$ and a power output circuit portion. The power output circuit portion comprises an output terminal $Vo_{110}$ which is also a power output terminal of the power conversion apparatus.

The power output circuit portion comprises an inductor $Lm_{100}$, a capacitor $Co_{100}$ and an output diode $Do_{100}$ interconnecting the inductor $Lm_{100}$ and the capacitor $Co_{100}$.

The output diode $Do_{100}$ is a current output diode which is to output current to a load connected to the load side of the power conversion apparatus.

The inductor $Lm_{100}$ comprises a first terminal ("power inductor first terminal") which is connected to the first power supply rail 320 and a second terminal ("power inductor second terminal") which is connected to the input terminal of the diode $Do_{100}$. The inductor $Lm_{100}$ is also referred to as a power inductor since it is to deliver a power output current to the output of the power switching branch during the off-cycle of the power switching device $M_{110}$ (or "power switch" in short).

The capacitor $Co_{100}$ comprises a first terminal ("output capacitor first terminal") which is connected to the first power supply rail 320 and a second terminal ("output capacitor second terminal") which is connected to the output terminal of the diode $Do_{10}$. The capacitor $Co_{100}$ is also referred to as a power capacitor or an output capacitor since it is to smoothen the power output current during power output operations.

The output diode $Do_{100}$ comprises a first terminal ("output diode first terminal") which is connected to the second terminal of the power inductor $Lm_{100}$ and a second terminal ("output diode second terminal") which is connected to the second terminal of the output capacitor $Co_{10}$. The output diode first terminal of the example diode $Do_{100}$ is an input terminal of the output diode $Do_{100}$ which is anode of the diode $Do_{100}$ in this example and the output diode second terminal is an output terminal of the output diode $Do_{100}$ which is cathode of the diode $Do_{100}$ in this example. The output diode $Do_{100}$ electrically connects the power output terminal of power inductor to the output terminal of the output capacitor $Co_{100}$. The output diode $Do_{100}$ has a forward direction or forward current direction which is in a direction from the first terminal to the second terminal.

The output capacitor $Co_{100}$ first terminal and the output diode $Do_{100}$ second terminal are electrically merged and/or connected with the power output terminal $Vo_{110}$ of the power conversion apparatus.

The power switching device $M_{100}$ comprises a first terminal ("power switching device first terminal") which is a current flow-in terminal, a second terminal ("power switching device second terminal") which is a current flow-out terminal and a third terminal which is a control terminal $G_{100}$, or more specifically a switching control terminal. A current flow channel, through which switched current is to flow during power switching operations, is defined between the first terminal and the second terminal. The current flow channel is a switchable conductive channel since the channel can be turned on and turned off by a control signal applied at the switching terminal of the power switch. The power switching device is an electronic power switching device ("switching device" in short) and power MOSFET is a typical example of such a power switching device. IGBT, BJT and thyristor are other examples of electronic power switching device commonly used for switching power supply applications.

The first terminal of the power switching device $M_{100}$ is physically and electrically connected to the second terminal of the power inductor $Lm_{100}$. Parasitic inductance similar to parasitic inductance $Lk_{10}$ of the example circuits of FIGS. 1 and 2 may or may not present, but shall be ignored at the moment for the sake of succinctness or simplicity.

The example power conversion apparatus of FIG. 4 comprises a basic power conversion circuit of a conventional buck-boost power converter and has the basic functions of a buck-boost power converter.

The power switching device $M_{100}$ has parasitic capacitance. Parasitic capacitance may present and may be distributed at different locations of the switching device $M_{100}$. Parasitic capacitance distributed in parallel with the switchable conductive channel of the switching device $M_{100}$ is the subject of the present aspect of the disclosure.

Referring to FIG. 4, the parasitic capacitance is represented schematically by a parasitic capacitor $Cp_{100}$ having a first terminal which is connected to the first terminal of the power switching device $M_{100}$ and a second terminal which is connected to the second power supply rail $Vi_{110}$.

An auxiliary switch $Mo_{100}$ is connected in parallel with the output diode $Do_{100}$.

The auxiliary switch $Mo_{100}$ is also an electronic power switching device, and comprises a first terminal ("auxiliary switching device first terminal") which is a current flow-in terminal, a second terminal ("auxiliary switching device second terminal") which is a current flow-out terminal and a third terminal which is a control terminal $G_{200}$, or more specifically a switching control terminal. A current flow channel, through which switched current is to flow during power switching operations, is defined between the first terminal and the second terminal. When the power switch $Mo_{100}$ is turned on, the current flow channel has an extremely low impedance and current can flow from the first terminal to the second terminal, but not in a reverse direction.

The auxiliary switching device first terminal is connected to the cathode of the output diode $Do_{100}$, the auxiliary switching device second terminal is connected to the anode of the output diode $Do_{100}$, and the control terminal $G_{200}$ is connected to the output of a control device. The output diode $Do_{100}$ and the current flow channel of the auxiliary switch $Mo_{100}$ are electrically connected in parallel, although the current flow channel has a current flow direction which is opposite the forward direction of the output diode $Do_{100}$. The output diode $Do_{100}$ can be a discrete diode or the internal diode of an electronic switch, e.g. the inherent parallel diode of a MOSFET.

An example train of control pulses as an example of power conversion control signals similar to that of FIG. 2A is depicted in FIG. 5A. The switching pulses comprises alternately disposed on-pulses and off-pulses. An example on-pulse rises instantly from an off-voltage to an on-voltage at an initial time $t_0$, falls instantly to an off-voltage at time $t_1$, and stays at the on-voltage level between the on-pulse duration $t_0$ and $t_1$.

When the power switch $M_{100}$ is in an on-state during an on-pulse duration between $t_0$ and $t_1$, current flows from the first power supply rail to the second power supply rail after passing through the power inductor $Lm_{100}$ and the power switch $M_{100}$. When in the on-state, the power switch $M_{100}$ has a zero or near zero voltage drop across its first terminal and its second terminal. As the first terminal has a zero or near zero voltage relative to the voltage of the second power supply rail, no current will flow through the output diode $Do_{100}$ during the on-state and there is no or minimal power output from the power conversion apparatus. As a result of current flow through the power switch $M_{100}$, the parasitic capacitance of the power switch $M_{100}$ is charged-up before the end of the on-state. The current rises gradually, or almost linearly, between $t_0$ and $t_1$ due to the inductance of the power inductor $Lm_{100}$.

When the power switch $M_{100}$ is turned off at $t_1$ and moves into the off-cycle, the energy which was stored in the inductor $Lm_{100}$ during the on-cycle will continue as an output current which is to flow from the inductor $Lm_{100}$ to the output terminal $Vo_{110}$ via the diode $Do_{100}$. The output current falls gradually, or almost linearly, until reaching a zero current at $t_3$, as depicted in FIGS. 5D and 5F.

By having the auxiliary switch $Mo_{100}$ turned on at $t_3$, the falling current which was flowing in the inductor $Lm_{100}$ immediately before turning off of the diode $Do_{100}$ at $t_3$ will continue to flow, albeit through the auxiliary switch $Mo_{100}$ and in a direction opposite to the diode forward direction of the diode $Do_{100}$. The falling current will continue to flow through the auxiliary switch $Mo_{100}$ between during $t_3$ and $t_4$, when the auxiliary switch $Mo_{100}$ is in an on-cycle, as shown in FIG. 5G.

A reverse current flow from the parasitic capacitor $Cp_{100}$ will result in the discharge of the electronic charges which are parasitic charges built up in the parasitic capacitor $Cp_{100}$ during the last on-cycle. The reverse current flow can be facilitated, for example, by applying a negative voltage on the inductor $Lm_{100}$, and the negative voltage will cause a negative current flow through the inductor $Lm_{100}$. A short pulse of reverse current flow from the power switch $M_{100}$ would be sufficient to discharge the electronic charges stored in the parasitic capacitor $Cp_{100}$, and the reverse current flow can be generated by applying a short negative voltage pulse on the inductor $Lm_{100}$ which is to cause a short reverse current pulse in the inductor $Lm_{100}$. An short negative voltage pulse on the inductor $Lm_{100}$ can be generated, for example, by turning on or keep turning on the auxiliary switch $Mo_{100}$ on for a short duration after the current output by the inductor $Lm_{100}$ has dropped to zero at $t_3$, as depicted in FIG. 5D.

By turning the auxiliary switch $Mo_{100}$ on during the parasitic discharge duration between $t_3$ and $t_4$, as depicted in FIG. 5E, the auxiliary switch $Mo_{100}$ is in the on-state during $t_3$ and $t_4$. As a result of the turning on of the auxiliary switch $Mo_{100}$, a short negative voltage pulse will appear on the inductor $Lm_{100}$ between $t_3$ (that is, at the time when the inductor current falls to zero) and $t_4$ (that is, the time when the auxiliary switch $Mo_{100}$ is turned off). The short negative voltage pulse on the auxiliary switch $Mo_{100}$ will result in a short current flow through the auxiliary switch $Mo_{100}$, as depicted in FIG. 5G.

It will be appreciated that $t_4$ is after $t_3$ and $t_4$ in the example embodiment is in and near the end of the current off-cycle or near the beginning of the next on-cycle.

When the auxiliary switch $Mo_{100}$ is turned off at $t_4$, the current path that was connecting the inductor $Lm_{100}$ and the output terminal $Vo_{100}$ during the on-cycle (that is, between $t_3$ and $t_4$) of the auxiliary switch $Mo_{100}$ is no longer available. To maintain current flow continuity in the inductor $Lm_{100}$, so that an end current which was flowing in the inductor $Lm_{100}$ immediately at or before $t_4$ would not abruptly stop, a new current path defined by the inductor $Lm_{100}$ and the parasitic capacitor $Cp_{100}$ in series will be formed. As a result of the availability of the new current path, the end current will continue to flow in the inductor $Lm_{100}$ in a direction away from the capacitor $Cp_{100}$, thereby discharging the parasitic charges stored on the capacitor $Cp_{100}$, since the flow of current in the inductor $Lm_{100}$ in a direction away from the capacitor $Cp_{100}$ is in a reverse direction opposite to the direction of current which charges up the capacitor $Cp_{100}$ during the on-cycle.

With the flow of the reverse direction in the new current path for a duration sufficient to discharge the parasitic charges stored on the capacitor $Cp_{100}$, the stored parasitic charges will be returned to and stored in the inductor $Lm_{100}$ during the off-cycle of the power switch $M_{100}$, and the risks of spike voltage or spiky current at the next on-cycle of the of the power switch $M_{100}$ are alleviated or at least mitigated. The new current path is a parasitic charge discharging path since its function is for discharging parasitic charges stored on the capacitor $Cp_{100}$. The flow of the reverse direction in the new current path is during a discharge duration between $t_4$ and $t_5$, as depicted in FIGS. 5C and 5E.

As the duration between $t_3$ and $t_4$ can be very small, the turn on period of the auxiliary switch $Mo_{100}$ can be very small. Since the parasitic capacitor $Cp_{100}$ and therefore the parasitic charges are typically very small, the rms (root-mean-square) discharge current will be very small, a very small electronic switch can be used to save costs.

Furthermore, the exact turn-on time of the auxiliary switch $Mo_{100}$ is not critical, and can be an engineer's practical design choice without loss of generality. For example, the turn on time can be close to the zero-current point $t_3$ of the inductor $Lm_{100}$, can be before or after $t_3$, and the auxiliary switch $Mo_{100}$ is turned off at a point when enough negative current has been generated. In general, the negative current is much smaller than the peak current of the inductor $Lm_{100}$ during normal power operations.

The auxiliary switch $Mo_{100}$ is operated by a controller which sends a driving signal to the switching terminal $G_{100}$ of the auxiliary switch $Mo_{100}$. The driving signal may comprise a train of switching pulses comprising alternate on-pulses and off-pulses. An example on-pulse is depicted in FIG. 5E and comprises a square pulse which extends in an on-cycle between $t_3$ and $t_4$, and the on-pulse is between two off-pulses without loss of generality. The switching timing of the auxiliary switch $Mo_{100}$ may be controlled by the same controller which controls the main power switch $M_{100}$, but can be controlled by another controller without loss of generality. The power conversion circuit may comprise a current detector, so that the controller is to turn on the when the auxiliary switch $Mo_{100}$ when the falling forward diode current which flows through the diode $Do_{100}$ drops to zero or near zero. The controller may be pre-set to turn off the auxiliary switch $Mo_{100}$ at a time when the reverse current which flows through the auxiliary switch $Mo_{100}$ during the on-cycle of the auxiliary switch $Mo_{100}$ is sufficient to cause complete discharge of the stored parasitic charges on the parasitic capacitor $Cp_{100}$.

FIG. 5 is another embodiment of the power conversion circuit of FIG. 4. The power conversion circuit of FIG. 4 is substantially identical to that of FIG. 4, except the inductor $Lm_{100}$ is replaced by a pair of magnetically coupled inductors $Lp_{200}$ and $Ls_{200}$. The inductors $Lp_{200}$ and $Ls_{200}$, which are magnetically coupled and electrically isolated, cooperate to form a transformer, wherein the inductor $Lp_{200}$ is a primary inductor on the primary side of the transformer and the inductor $Ls_{200}$ is a secondary inductor on the secondary side of the transformer. The description herein on and in relation to the power conversion circuit of FIG. 4 is incorporated herein by reference and to apply mutatis mutandis, with corresponding numerals increased by 100.

When the main power switch $M_{200}$ is turned on so that the main power switch $M_{200}$ is in an on-cycle, current start to ramp up and flow in the primary winding of the primary inductor $Lp_{200}$, and energy is stored in the primary inductor $Lp_{200}$. When the main power switch $M_{200}$ is turned off, the current path of the primary inductor $Lp_{200}$ during the on-cycle is no longer available, and the end current which was in the primary inductor $Lp_{200}$ immediately before the main power switch $M_{200}$ was turned off would need to find a discharge path. The secondary inductor $Ls_{200}$, which is magnetic coupling with the primary inductor $Lp_{200}$, provides such a discharge path. As a result, the end current will flow through the secondary inductor $Ls_{200}$ and the output diode $Do_{200}$ and pump into output capacitor $Co_{200}$ to energize the output side. Although the power conversion circuit of FIG. 5 comprises a transformer, a similar mechanism of parasitic charges recovery applies to the present embodiment.

Specifically, the auxiliary switch $Mo_{100}$ is to be turned on for a short duration after the current in the secondary inductor $Ls_{200}$ has fallen to zero so that a small amount of negative current will flow into the secondary inductor $Ls_{200}$ for the short duration. When the auxiliary switch $Mo_{100}$ is turned off following the flow of the small negative current, the current path which was available to the secondary inductor $Ls_{200}$ when the auxiliary switch $Mo_{100}$ was in the on-cycle is no longer available. The primary inductor $Lp_{200}$ provides a new or alternate current path for continuation of the small negative current and this current path will be in the form of a negative current path on the primary inductor $Lp_{200}$, so that a discharge current will flow out of the main switch $M_{200}$ and into the primary inductor $Lp_{200}$. The discharge current is to flow in the new or alternate current path which is formed by the primary inductor $Lp_{200}$ and the parasitic capacitor $Cp_{100}$ in series and in a direction opposite to the charging current to discharge the parasitic charges on the main switch $M_{200}$.

With the flow of a reverse direction in the new current path for a duration sufficient to discharge the parasitic charges stored on the capacitor $Cp_{200}$, the stored parasitic charges will be returned to and stored in the inductor $Lp_{200}$ during the off-cycle of the power switch $M_{200}$, and the risks of spike voltage or spiky current at the next on-cycle of the of the power switch $M_{200}$ are alleviated or at least mitigated. The new current path is a parasitic charge discharging path since its function is for discharging parasitic charges stored on the capacitor $Cp_{100}$.

After the parasitic charges on the main switch $M_{200}$ have been discharged, whether fully or substantially, the main switch $M_{200}$ can be turned on at the next on-cycle with a voltage spike caused by the parasitic charges. Furthermore, since the parasitic charges are returned to the power output circuit portion during the off-cycle of the main switch $M_{200}$ and not dissipated as waste heat, efficiency of the power conversion circuit is improved and heat dissipation due to the parasitic capacitor $Cp_{200}$ is reduced. Likewise, the diode $Do_{200}$ can be a discrete diode or the internal diode of an electronic switch, e.g. inherent parallel diode of a MOSFET.

While the disclosure has been made with reference to example basic DC/DC converters, one of ordinary skill in the art would appreciate that the disclosure is applicable mutatis mutandis to switching circuits, for example, other DC/DC conversion circuits without loss of generality. In this specification, the term "connect" means physically and electrically connect unless the context requires otherwise requires.

While the example power converters are boost converters, the disclosure is applicable mutatis mutandis to buck converter or buck-and boost converters without loss of generality.

The invention claimed is:

1. A power conversion apparatus comprising a power switching branch which is configured to operate on input power to produce converted power by power switching operations, a power output portion for outputting the converted power, and a clamper circuit; wherein the power switching branch comprises a power inductor and a semiconductor switch which are connected in series; wherein the semiconductor switch is configured to switch between a power output state and a non-power output state at a switching frequency to perform the power switching operations; wherein the clamper circuit is configured to output energy which is built-up or stored on a parasitic reactive element or parasitic reactive elements during a non-power output cycle to the power output portion in a power output cycle immediately following the non-power output state; wherein the power switching branch comprises a parasitic inductor which interconnects the power inductor and the semiconductor switch, wherein the parasitic inductor and the semiconductor switch have a common node, wherein the clamper circuit is arranged as a clamper branch and comprises a clamper capacitor, a first diode, and a parallel assembly which are in series connection; wherein the parallel assembly interconnects the clamper capacitor and the first diode, and comprises a parallel connection of a clamper inductor and a second diode; wherein the first diode has its anode connected to the common node and has its cathode connected to the parallel assembly; wherein the clamper capacitor has a first terminal which is connected to the parallel assembly and a second terminal connected to a power supply rail; and wherein the second diode is connected with its anode connected to the cathode of the first diode and with its cathode connected to the clamper capacitor.

2. The power conversion apparatus according to claim 1, wherein the first diode is configured to permit flow of energy that was built-up in the parasitic inductor to pass through the parallel assembly and to be stored on the clamper capacitor as clamped energy during an initial period of the power output cycle immediately following the non-power output state, and wherein the first diode is configured to permit reverse flow of the clamped energy to the power output portion during a subsequent period of the power output cycle immediately following the initial period.

3. The power conversion apparatus according to claim 1, wherein the first diode has a first reverse recovery time and is configured so that the reverse flow of clamped energy comprises a first portion which occurs in a first period during which the first diode is within its reverse recover time and a second portion which occurs in a second period immediately following the first period and which is facilitated by a reverse voltage build-up in the clamper inductor.

4. The power conversion apparatus according to claim 3, wherein the second diode has a second reverse recovery time which is shorter than the first reverse recovery time so that the second diode is recovered and is to prevent reverse flow of energy through the second diode after the end of the first period.

5. The power conversion apparatus according to claim 1, wherein the clamper inductor and the second diode are to cooperate to control reverse flow of stored energy from the clamper circuit to the output portion.

6. The power conversion apparatus according to claim 1, wherein the clamper capacitor has a capacitance which is adapted to store energy which was built-up on the parasitic inductor during a non-power output cycle.

7. The power conversion apparatus according to claim 1, wherein the clamper circuit comprises diodes and reactive components and no resistive component.

8. The power conversion apparatus according to claim 1, wherein the first diode and the second diode are arranged such that their forward conductive directions are same and in a direction towards the clamper capacitor.

9. A power conversion apparatus comprising a power switching branch which is configured to operate on input power to produce converted power by power switching operations, a power output portion for outputting the converted power, and a clamper circuit; wherein the power switching branch comprises a power inductor and a semiconductor switch which are connected in series; wherein the semiconductor switch is configured to switch between a power output state and a non-power output state at a switching frequency to perform the power switching operations; and wherein the clamper circuit is configured to output energy which is built-up or stored on a parasitic reactive element or parasitic reactive elements during a non-power output cycle to the power output portion in a power output cycle immediately following the non-power output state; wherein the semiconductor switch comprises a first terminal and a second terminal and is operable in an on-state or an off-state;
wherein a low impedance current conductive path is formed between the first terminal and the second terminal when in the on-state and a high impedance current blocking path is formed between the first terminal and the second terminal when in the off-state; and wherein the clamper circuit comprise a first terminal and a second terminal which are electrically connected with the first and second terminals of the semiconductor switch.

10. The power conversion apparatus according to claim 9, wherein the apparatus comprises a first power supply rail and a second power supply rail, wherein the power inductor comprises a first terminal which is connected to the first power supply rail and a second terminal which is physically connected to a first terminal of the semiconductor switch, wherein the semiconductor switch of the power switching branch is a main power switch of the apparatus, wherein the power output portion comprises an output diode and an output capacitor, wherein the output capacitor has a first terminal which is connected to the first power supply rail and a second terminal which is connected to an output terminal of the apparatus, and wherein the output diode has its anode connected to the second terminal of the power inductor, its cathode connected to the terminal of the output capacitor, and its diode forward direction towards the power output terminal.

11. The power conversion apparatus according to claim 10, wherein the clamper circuit comprises a semiconductor switch which is configured as an auxiliary electronic switch in parallel connection with the output diode; wherein the auxiliary electronic switch is switchable between an on-state during which an auxiliary current path permitting a flow of auxiliary current in a reverse direction opposite to the diode forward direction is formed and an off-state during which the auxiliary current path is blocked or impeded; and
wherein the auxiliary electronic switch is configured to cause flow of a reverse current through the power inductor when current flowing through the power inductor drops to zero to neutralize energy build-up due to a parasitic capacitor of the semiconductor switch when the semiconductor switch is switched from an on-state to an off-state.

12. The power conversion apparatus according to claim 11, wherein, during power conversion operations and during an off-cycle of the main power switch, the auxiliary electronic switch is to be turned on to permit a continuation of current to flow in the inductor after a forward current flowing to the output terminal through the power inductor and the output diode has fallen to zero and to remain turned on for an on-duration to facilitate a reverse current flow through the auxiliary electronic switch, wherein the on-duration is set to cause discharge of parasitic charges stored on the main power switch when the main power switch is in an off-state.

13. The power conversion apparatus according to claim 10, wherein the auxiliary electronic switch is turned on at or near a time when the forward current in the output diode falls to zero.

14. The power conversion apparatus according to claim 10, wherein the on-duration of the auxiliary electronic switch is very much shorter than the on-duration or off-duration of the main power switch.

15. The power conversion apparatus according to claim 10, wherein the auxiliary electronic switch has a much lower current rating than that of the main power switch;
and/or wherein the output diode is an inherent diode of the auxiliary electronic switch.

16. The power conversion apparatus according to claim 10, wherein the power conversion apparatus comprises a controller which is to execute stored instructions to control the main power switch and the auxiliary electronic switch; and/or wherein the power conversion apparatus comprises a capacitor having a capacitor first terminal which is connected to the first power supply rail and a capacitor second terminal which is connected to the output terminal of the power output circuit.

17. A power conversion circuit comprising an electronic power switch, a power output circuit comprising a power output terminal, a first power supply rail and a second power supper rail, wherein the power switch comprises a switch first terminal, a switch second terminal which is connected to the second power rail and a switch third terminal which is a switching terminal, wherein the power switch is switchable by a train of switching pulses between an on-state during which current is to flow from the switch first terminal to the switch second terminal and an off-state during which flow of current between the switch first terminal and switch second terminal is impeded or blocked; wherein the output circuit comprises an inductor having an inductor first terminal which is connected to the first power supply rail and an inductor second terminal which is connected to the power switch first terminal, a capacitor having a capacitor first terminal which is connected to the first power supply rail and a capacitor second terminal which is connected to the output terminal of the power output circuit, and a diode having diode forward direction, a diode first terminal which is connected to the inductor second terminal and a diode second terminal which is connected to the output terminal; wherein the output circuit comprises an auxiliary electronic switch which is in parallel connection with the output diode and which is switchable between an on-state during which an auxiliary current path permitting a flow of auxiliary current in a reverse direction opposite to the diode forward direction is formed and an off-state during which the auxiliary current path is blocked or impeded; and wherein, during power conversion operations and during an off-cycle of the main power switch, the auxiliary electronic switch is to be turned on to permit a continuation of current to flow in the inductor after a forward current flowing to the output terminal through the inductor and the output diode has fallen to zero and to remain turned on for an on-duration to facilitate a reverse current flow through the auxiliary electronic switch, wherein the on-duration is set to cause discharge of parasitic charges stored on the main power switch when the main power switch is in an off-state.

18. The power conversion circuit according to claim 17, wherein a discharge current is to flow from the main power switch to the inductor immediately after the auxiliary electronic switch is turned off.

* * * * *